Feb. 29, 1944.    A. C. McWILLIAMS    2,342,876
CAMERA
Filed Jan. 12, 1942    2 Sheets-Sheet 1

Inventor
Arthur C. McWilliams
By Foorman L. Mueller
Atty

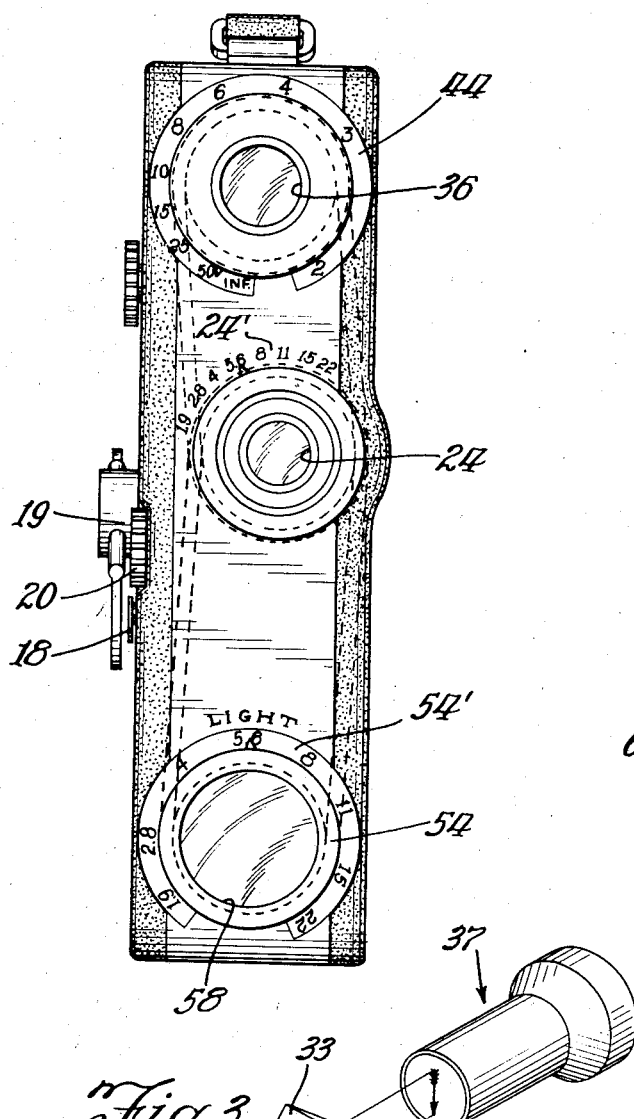
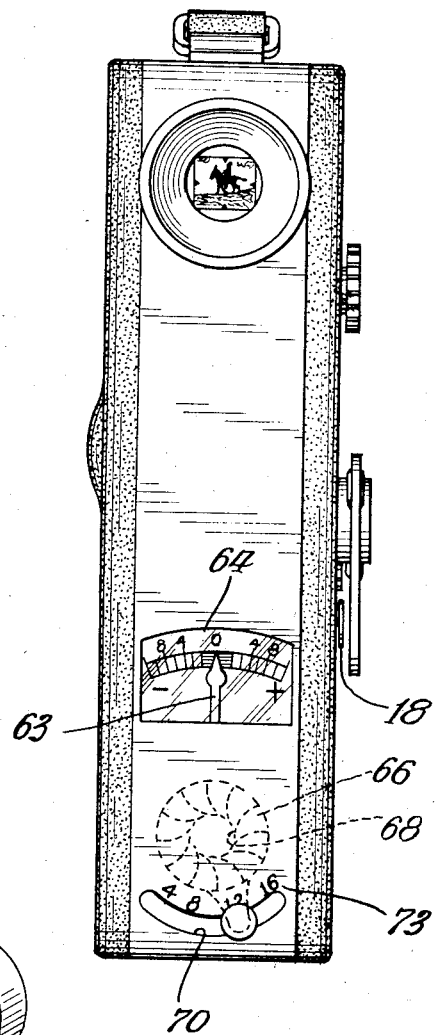
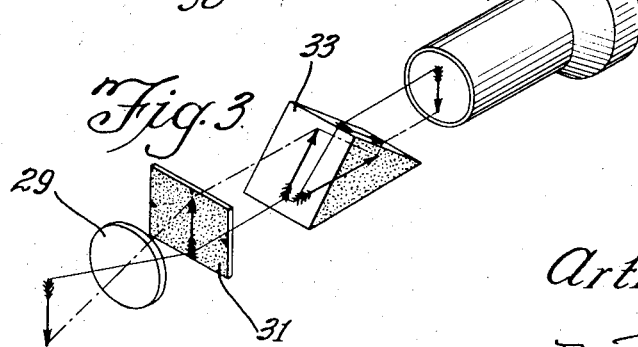
Inventor:
Arthur C. McWilliams

Patented Feb. 29, 1944

2,342,876

UNITED STATES PATENT OFFICE 2,342,876

CAMERA

Arthur C. McWilliams, Chicago, Ill.

Application January 12, 1942, Serial No. 426,431

2 Claims. (Cl. 95—10)

This invention relates in general to camera equipment which generally is embodied in a small portable housing of either the movie type or still-camera type adapted to be operated while held at an eye of the operator for proper directioning or aiming. More particularly, the invention relates to mechanism all embodied within the camera housing for quickly and accurately focusing the lens of the camera, and determining and regulating the amount of light passed to the film within the camera.

There has been marked simplification in cameras of the so-called candid type in recent years, and a similar simplification in portable movie cameras, as well as a corresponding reduction in price of such cameras so that they were brought within a price class enjoying large volume sales. However, the simplification has not gone so far that an amateur operator or photographer is able consistently to take well-focused and properly exposed pictures without the use of means entirely separate from the camera and its housing, or means supplementary thereto, such as an accessory which is used only occasionally and after substitution by the operator of the original equipment. This difficulty is particularly serious in the case of viewing the image of the object to be photographed so that proper focusing of the camera can be accomplished and in obtaining the proper quantity of light on the film for exposure so that the best exposure is obtained.

So-called automatic range-finder and focusing mechanism has been employed but it is still difficult to positively predict the appearance of the object to be photographed because the image at the eye-aperture or opening in the camera is small, and not accurately associated with the camera lens picture. This difficulty has been recognized and supplementary lenses are supplied as auxiliary equipment for cameras of both the movie and still type.

With improved films having high sensitivity to light such as is now universally used in both the movie and still cameras, and due to improved camera equipment, it is possible to take pictures which are more perfect in comparison to those taken with the simple, inexpensive cameras of years gone by. Such improved pictures can be obtained however, only with a proper consideration of the light intensity, or volume, on the object being photographed, which light normally passes into the camera through the lens to expose the film. There has been some effort in the prior art to incorporate a light meter into the housing of the camera but these so-called light meters were stationary and the proper iris or diaphragm opening in the camera lens assembly corresponding to the light present could only be ascertained with such device after rather elaborate and difficult calculations on tables furnished with the camera. Light meters of this type themselves were not particularly sensitive and reading thereof was difficult. In addition the calculations were complicated, so that the net result of the operation was an inferior determination of the light present for exposing the film in the camera. Expensive in some cases, and in all, rather complicated auxiliary light meters provided in an entirely separate housing from the camera have been the most generally accepted answer to the problem of determining light intensity for exposure. It is substantially impossible for the ordinary amateur photographer who only takes occasional pictures and never makes an intensive study of the subject of photography to accurately operate this equipment even if he can justify the expense of using the same.

It is an object of my invention to provide an improved camera of either the still, or the movie type, which can be operated by the ordinary inexperienced photographer so as to take and provide accurate and well defined photographs from the standpoint of both focusing and exposure.

Another object of my invention is to provide an improved camera with lens focusing and iris or diaphragm-opening adjustments being calculated and accomplished entirely in a self-contained camera by means of equipment within the housing for the camera.

It is another object of my invention to provide an inexpensive camera of the movie or still type which can be readily operated by an inexperienced photographer to take pictures of a substantially professional character.

One of the features of my invention is the provision of combination focusing and film-exposure-light-passing equipment all contained within the housing for a camera, and adjustable thereon by the simplest type of operations.

Another feature of my invention is the provision of a camera lens and diaphragm unit or assembly which is directly connected with adjustable focusing lens mechanism and with adjustable light meter mechanism so that the adjustment of the two mechanisms automatically focuses the camera lens and sets the camera diaphragm to the correct opening for the proper amount of light for the picture.

Other objects and features will be apparent from the following description taken with the drawings in which:

Fig. 3 is a diagrammatic view of the viewing or focusing mechanism for viewing the object and adjusting the camera lens;

Fig. 4 is a front elevational view of the camera of Fig. 1; and

Fig. 5 is a rear elevational view thereof.

The present invention may be embodied in either a movie-type camera as illustrated herein, or in a still-type. Either type of camera includes an adjustable camera lens and diaphragm unit, and the invention provides means all within the camera housing connected with the unit for automatically focusing the lens, and for adjusting the diaphragm or iris to the desired stop or exposure opening. An adjustable magnifying viewing lens together with an adjustable focusing lens are employed for setting the camera lens. The focusing lens is mechanically connected with the camera lens. The diaphragm is adjusted by means including a selenium cell which registers zero upon the introduction of the correct amount of light thereon through a diaphragm interconnected with and correspondingly set relative to the diaphragm opening in the camera lens unit.

Figure 1:
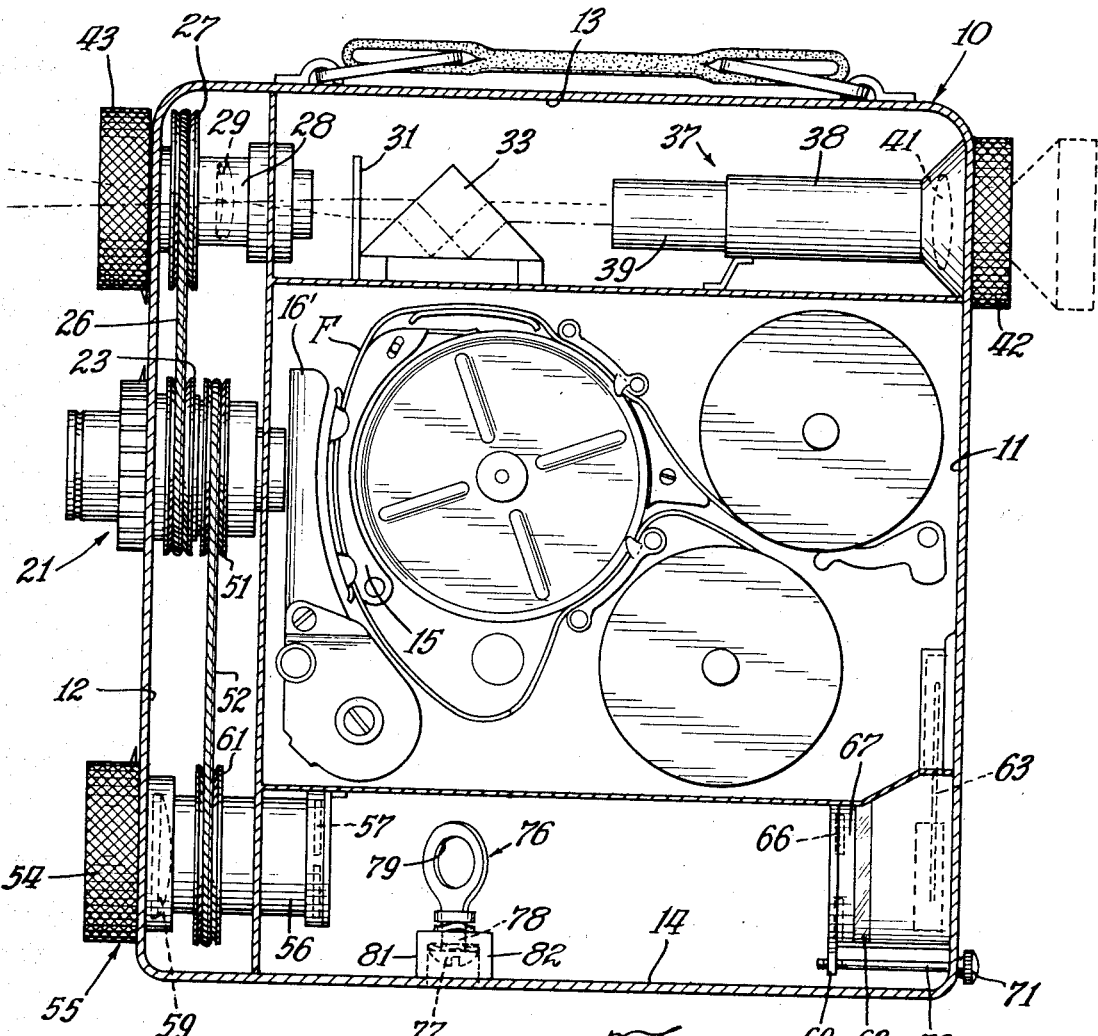
Fig. 1 is a vertical sectional view taken longitudinally through the camera housing with the portions of the camera mechanism shown in full lines.

Referring now to Fig. 1, the movie camera as illustrated, includes a closable housing 10 with a plurality of closed compartments therein including a film and shutter carrying compartment 11 centrally thereof, and a vertical compartment 12 extending entirely over the front of the camera housing. Additional closed compartments 13 and 14 are provided at the top and bottom respectively, of the housing for the purpose to be described. Film F is carried within the compartment 11 and passes from one reel to another through film guide means 15 and in back of a rotary shutter 16. Shutter 16 is obscured by the gate mechanism 16' and is not shown in Fig. 1, but is illustrated diagrammatically in Fig. 2 and includes an aperture 17 which exposes the film F to light coming through the lens unit. This particular portion of the mechanism is no part of my invention, but may be conventional according to many different constructions available in this art.

Suitable mechanism is employed for rotating the shutter 16 in response to movement of the starting lever 18 shown on the outside of the camera housing in Figs. 4 and 5. Normally, a spring motor provides the driving force for the shutter, and such spring motor is wound up by a handle or key 19 on the outside of the camera. In Fig. 4 is illustrated a knurled knob 20 suitably connected with the shutter mechanism to vary the speed thereof in accordance with the shutter speed desired for the particular characteristics of the film employed, or for the speed of movement of the object, or for the volume of light as it may be related to the film and speed of movement of the object being photographed. This mechanism is all of conventional structure and utilized in a conventional manner.

Figure 2:
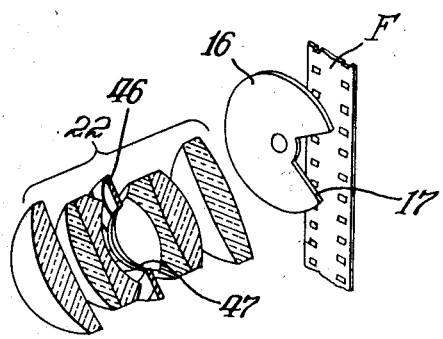
Fig. 2 is a diagrammatic view in perspective of the lens and diaphragm unit, with the movable shutter intermediate such unit and the film to be exposed.

With reference to the camera lens and diaphragm unit, or assembly 21, it might be explained briefly that a camera lens is a transparent body designed for creating, by the principle of refraction, a true image of an object to be photographed. The function of a lens is to recombine the rays of light from a point source outside of the camera to a point in the plane of the film, as film F at the shutter 16. The rays of light which are recombined by the lens assume varying angles relative to one another with variations in distance between the object photographed and the lens. In order to focus the rays of light on the film it is necessary to vary the position of the lens to bring it into focus as the distance between the object and the lens varies. Inasmuch as a particular lens system is not important to the application of the present invention to a camera, the lens unit or assembly 21 is not illustrated in detail. Numerous types and structures for the lens unit may be employed. However, a lens system as illustrated in Fig. 2 without the mountings and the like of Fig. 1, will be described in a general manner for a better understanding of the invention.

The lens unit or assembly 21 includes an adjustable lens 22 within a mounting to which is secured a pulley 23 adapted to be rotated to rotate the lens 22 and simultaneously move it axially to bring the lens system into the desired focus. Light is admitted to the lens unit through an opening 24 as shown in Fig. 4. Mechanically interconnected with the pulley 23 through a belt drive 26, or equivalent structure, is a rotary pulley 27 rigidly secured to a lens mounting 28 carrying a lens 29 therein for axial or longitudinal adjustment relative to a ground glass image plate 31 fixedly mounted in the compartment 13 at the top of the camera housing. Likewise fixedly mounted in said compartment is a prism 33 adapted to reverse the image viewed through an opening 36 (Fig. 4) in the viewing lens unit including lens 29. The various positions of the image being photographed are illustrated by arrows in Fig. 3 and these show the manner in which this image is projected to a magnifying lens unit 37 which enlarges the image after the manner of a magnifying glass.

In the great majority of cameras, both of the movie and of the still type, the image is viewed through a very small aperture applied to the eye of the photographer or operator while he is positioning and focusing the camera for taking pictures. In many cameras the viewing aperture is so small that obviously the image is of such size that it is difficult to accurately visualize the appearance of the object as it will be photographed on the film. This, results in wasted film and imperfect pictures due to inaccurate positioning and focusing. In this focusing and view-finding mechanism the magnifying lens unit 37 includes a fixed mounting 38 for slidably supporting a barrel 39 which carries therein a magnifying lens 41. The unit 37 also includes an enlarged eye piece 42 with a center aperture (Fig. 5) and a knurled rim which may be grasped by the operator, and with his eye comfortably fitted at the eye piece 42, the latter is moved inwardly and outwardly relative to the camera until the image as seen in Fig. 5 is magnified to a size that all of its details are discernible. The proper focus to magnify the image is thus ascertained by the operator and is a fixed point for each operator. Inasmuch as the unit 37 with lens 41 magnifies and focuses the image it eliminates the necessity for a person to wear glasses while operating the camera and thus makes for more accurate viewing and greater comfort for the operator. Sight correction is compensated in the focusing of the magnifying lens for each individual operator.

In this magnified condition for the image, focusing of the camera or picture lens 22 is accomplished by rotating the knurled knob 43 on the viewing lens to rotate the latter in a screw mounting to move it axially relative to the camera housing. As previously described, the pulley 27 on the viewing lens unit is directly connected with the corresponding pulley 23 in the camera or picture lens portion so that movement of the knob 43 simultaneously rotates the pulley 23 and correspondingly rotates and moves axially the movable lens 22 in the complete assembly or unit 21. At the same time the lens 29 is moving in the same manner so that the image at the eye piece 42 precisely corresponds with the image of the object which will be exposed on the camera film. An operator may prefer to guess at a preliminary focus for the viewing lens 29, and hence for the camera lens 22, by estimating the distance between the object and camera and then adjusting the knob 43 and pointer thereon to the foot scale 44 on the front of the camera. The focusing is then completed for a distinct picture for both the camera and viewing lenses.

The volume of light employed to expose the film F behind the shutter opening 17 must be regulated and determined as accurately as the lens 22 is accurately focused. The volume of light is varied by means of an adjustable diaphragm 46 included within the lens unit or assembly 21 and comprising a plurality of movable leaves separated at the center to provide an aperture 47 which varies in size as the position of the leaves varies. Because of the difficulty of illustrating the small leaves making up diaphragm 46, and because any commercial diaphragm may be used, such diaphragm is illustrated somewhat schematically in Fig. 2, with an aperture 47 therein. The diaphragm 46, or iris, when combined in the lens unit or assembly 21 acts as a valve to control the light passing through the lens of the camera and thus makes for perfect exposure control. By decreasing the opening 47 the volume of light for the exposure is slowed down when the picture is taken in bright light, or the exposure may be speeded up by increasing the opening 47 when the exposure is taken in dull light, so as to provide the particular film employed with the correct volume of light required. So far as is known, the only successful and accurate exposure meter or indicator heretofore used is the relatively expensive device which is entirely independent of the camera and is carried as a supplementary piece of equipment. In addition to this cost and inconvenience, rather complicated computations are normally necessary to determine the reading and apply it to the camera diaphragm setting. In the exposure determining mechanism of my invention the diaphragm or iris 46 not only may be accurately adjusted and set by inexpensive, simple means directly upon the camera housing, but I also provide means for compensating for emulsion speeds and lack of complete synchronism in the mechanism so that precision effects are obtained.

A pulley 51 secured to the mountnig for the diaphragm or iris 46 which may be of conventional construction, is rotated by a mechanical drive such as a belt 52 or equivalent means, to vary the size of the opening or aperture 47 formed in the diaphragm. A second rotatable unit 55 with diaphragms 57 is mounted at the bottom of the camera, and is associated with the picture diaphragm 46 in the control of the amount of light passing therethrough. The second diaphragm unit 55 includes a knurled rotary knob 54 at the front of the camera housing as shown in Fig. 4, and this is connected to a body portion 56 which in turn is connected to a diaphragm 57 of the same general construction of the diaphragm 46, and carried in a fixed mounting. The opening 58 at the front of the unit, with a lens 59 adjacent thereto is considerably larger than the opening 24 in the lens unit 21 because of the necessity of introducing a larger amount of light into the meter mechanism to be described, than is required for exposure of the film F at the shutter. A pulley 61 secured to the body portion 56 of the diaphragm unit carries the belt 52 and the rotation of the knob 54 and consequent adjustment of the diaphragm 57 causes a proportional relative movement of the diaphragm 46. As a result light passing through the lens unit 21 and through the diaphragm unit at the bottom of the camera is always directly proportional. The diaphragms and their related mechanism in the units 21 and 55 are synchronized in the manufacturing process, and scales 24' and 54' for the pointers on the knobs 24 and 54, respectively, are likewise directly proportional in control of light volume as indicated by stop openings for the diaphragms.

In order to measure the volume of light passing through the diaphragm unit 55, I provide a light sensitive cell 62, such as a selenium cell, fixedly mounted at the rear of the closed compartment 14 at the bottom of the camera. The edge of the cell 62 is shown at a housed assembly at the rear of the camera which also includes a movable pointer 63 mounted at its lower end and responsive to variations in electric current generated in the cell 62 by light projected thereon. Cell 62 is electrically connected to suitable means for driving the pointer 63 in accordance with conventional practice. The pointer 63 passes over a scale 64 visible at the rear of the camera as shown in Fig. 5.

Also included in the assembly at the rear of the camera is another diaphragm 66, similar in construction to diaphragms 46 and 57, which is mounted in the fixed portion 67 of the housing means for the complete assembly. The opening 68 (Fig. 5) is varied in size by the rotary or pivotal movement of the member 69 in an arcuate opening 70 by adjustment of the knob 71 connected to member 69 through a stem 72. Although the cell 62 and its pointer means is intermediate the rear wall of the camera and the diaphragm 66, the latter alone is illustrated in dotted lines in Fig. 5 so that there would be no confusion with the other parts.

The operation of this exposure determining and adjusting portion of the complete invention will now be described. Whereas, the light meters used in the prior art for mounting on cameras, and supplied separate from the cameras all require rather extensive computations from their readings to calibrate the proper diaphragm opening size relative to the light available for the film being employed, it is my desire to provide a direct reading means requiring substantially no calibrating or computing. Scale 64 for the indicator, and scale 73 for the diaphragm 66 adjustment at the light sensitive cell are originally calibrated in the laboratory. Standard diaphragm settings are provided for selected emulsion and camera speeds. Scale 73 is dimensioned to correspond with the emulsion speeds used. These figures are laboratory-obtained by calibration with a portable light meter, and adjusting the apertures or openings to settings in accordance with the meter readings. The two units, are maintained in a corresponding relation by the belt 52 extending over the pulleys 51 and 61. So that the "0" point of scale 64 will always register the correct amount of light required for a given diaphragm setting, too little light or too great a volume of light will be immediately discernible to the operator by a + or — variation from "0" as shown on the scale which is the perfect light volume for that setting.

The film manufacturers have computed the light required for exposure conditions on the various films commercially available and this data is taken into consideration when the scale 73 is calibrated. This characteristic of the film is known as the emulsion speed. As previously mentioned, the knob 71 for the diaphragm 66 is set by laboratory tests to positions that are accurate for placing the scale pointer 63 at the "0" position. This complete operation is all determined by the characteristics for a particular film whose speed is made known by the film manufacturer. Because there are various films available for the cameras of the type contemplated herein, the damper 76 is, during calibration, employed to shift the meter pointer 63 to the "0" indication when a particular film is employed. In the laboratory, the scale 73 is also set up with markings which will serve to indicate the stop openings for the different films. The pointer 63 will then read on "0" for the proper stop opening for each different film utilized in the camera. The camera is provided with suitable instructions to advise the operator of the particular setting of the knob 71 for each particular film, when this is accomplished, the pointer 63 should be set to register "0" by rotating knob 55.

It might be mentioned that although means for complete flexibility in the exposure determining and indicating mechanism is provided in my invention, the usual photographer operates with only one or two different films. As a result, it will be only in unusual cases that new settings must be made by the photographer for the diaphragm 66 and it will normally remain in the same position.

As to the operation of the indicator 63 over the scale 64; the photographer will adjust diaphragm knob 55 for the desired exposure using "0" setting for pointer 63. If too little light is entering through the openings 24 and 58, pointer 63 will move toward the minus (—) sign on the scale 64, and if too much light is entering, because of the position of the respective diaphragms, the pointer will move toward the plus (+) sign. Proper setting is then found when the pointer is exactly on "0." This provides a micrometric adjustment for the picture diaphragm 46 which will insure, with proper focusing of the camera, the highest quality pictures.

The adjustable damper mechanism 76 comprises an apertured member with a slotted head 77 at one end of a stem, or body 78, and a loop at the other end with an aperture 79 therein in axial or longitudinal alignment with the center point of the diaphragm 57 and the diaphragm 66. Spring washers 81 on the top and the bottom of a hollow mounting member 82 maintain the member 76 in any position to which it is adjusted by inserting a screw driver through a corresponding opening at the bottom of the camera for connection with the slotted head 77. With the member 76 at right angles to the line through the centers of the diaphragms 57 and 66 there is a maximum passage of light to the cell 62, and as the member 76 is rotated to the substantially maximum dampening position illustrated in Fig. 1 the light passing through the diaphragms is reduced. This, of course, changes the position of the indicator or pointer 63 for a corresponding opening of the diaphragm 66, and is used in the initial calibration of the light meter for a particular film emulsion speed. Furthermore this dampening member becomes useful as the light responsive characteristics of the cell 62 change over the life of the cell, because such cell normally loses some of its sensitivity with age. Scales 24' and 54' on the face of the camera show the usual stop opening indications.

It is thus seen from the above description that I provide a simplified and accurate means for focusing a camera and determining the amount of light passing through the focused picture lens to the film to expose the same. Although the invention has been described in its preferred embodiment, it is understood that it is not limited thereby, but is limited only by the scope of the appended claims.

I claim:

1. In a film camera having a single housing with a front wall and a rear wall, the combination including a front compartment within the housing adjacent the front wall extending substantially longitudinally of said wall, a pair of compartments oppositely disposed within said housing and extending from said front compartment to the rear wall of said housing, an adjustable unit in said front compartment substantially centrally thereof and having a portion extending through said front wall, said unit including a picture lens, and a picture diaphragm therein with connecting means on each independently movable for adjusting said lens and said diaphragm respectively, focusing means including a portion mechanically connected with said connecting means of said picture lens for projecting an image of the object to be photographed into one of said pair of compartments, an adjustable magnifying lens in said one compartment having a portion extending through the rear wall of the camera and adjustable so as to enlarge the image projected into said compartment, light responsive means in the other of said pair of compartments, an adjustable diaphragm unit having one portion extending through the front wall of said camera housing and another portion extending into said other compartment to pass light through said compartment to said light responsive means, and mechanical means connecting said picture diaphragm connecting means and said diaphragm unit so that adjustment of one simultaneously and correspondingly adjusts the other with said light responsive means indicating the light passing through the diaphragm unit and by relation indicating the light passing through the picture diaphragm.

2. Mechanism in a film camera for determining the volume of light passing into the camera to the film including in combination, light responsive means, and means for regulating the amount of light passing to said light responsive means, said regulating means including a pair of spaced apart apertured diaphragms, with each of said diaphragms being adjustable to vary the size of the aperture therein and with said apertures being in longitudinal alignment with one another and with said light responsive means and with light passable in a path over said line, and apertured means in the longitudinal line between the apertures of said two diaphragms for changing the volume of light passing from one aperture to the other over said path including a member having a body portion and a fixed aperture therein for passing light, with said body portion being movable about an axis at right angles to the longitudinal line between the diaphragm apertures and with the fixed aperture lying in a plane at right angles to said path of light between said diaphragm apertures when in a position to pass the maximum volume of light to the second of said pair of diaphragms from the first diaphragm, and said body portion being movable about said axis out of said plane to adjustably interfere with said path of light and reduce the volume of light passing over said path to the second diaphragm.

ARTHUR C. McWILLIAMS.